US008004450B2

(12) United States Patent
Chu et al.

(10) Patent No.: US 8,004,450 B2
(45) Date of Patent: Aug. 23, 2011

(54) WIRELESS AV TRANSMITTING SET

(76) Inventors: James Chu, Taipei County (TW); Heng-Chun Ho, Taipei County (TW)

( * ) Notice: Subject to any disclaimer, the term of this patent is extended or adjusted under 35 U.S.C. 154(b) by 667 days.

(21) Appl. No.: 12/122,863

(22) Filed: May 19, 2008

(65) Prior Publication Data

US 2009/0284403 A1 Nov. 19, 2009

(51) Int. Cl.

| | |
|---|---|
| ***H04B 1/20*** | (2006.01) |
| ***G05B 11/01*** | (2006.01) |
| ***G08C 19/00*** | (2006.01) |
| ***H04M 1/66*** | (2006.01) |
| ***H04W 24/00*** | (2009.01) |
| ***H04N 7/173*** | (2006.01) |
| ***H04N 7/16*** | (2006.01) |

(52) U.S. Cl. ... 341/176; 340/4.42; 340/12.5; 340/12.52; 455/411; 455/410; 455/556.1; 725/100; 725/131; 725/151

(58) Field of Classification Search ............. 340/825.22, 340/4.42, 12.5, 825.24, 825.71, 825.722; 358/194.1, 188; 455/4, 5, 6, 151, 352; 348/734, 348/706, 569; 710/14, 15, 63
See application file for complete search history.

(56) References Cited

U.S. PATENT DOCUMENTS

| | | | | |
|---|---|---|---|---|
| 7,280,100 | B2 * | 10/2007 | Hanson et al. | 345/169 |
| 2004/0137878 | A1 * | 7/2004 | Oyama | 455/411 |
| 2005/0102699 | A1 * | 5/2005 | Kim et al. | 725/81 |
| 2006/0026656 | A1 * | 2/2006 | Chen | 725/100 |
| 2006/0258440 | A1 * | 11/2006 | Vitito | 463/29 |

* cited by examiner

*Primary Examiner* — Brian A Zimmerman
*Assistant Examiner* — Mirza Alam
(74) *Attorney, Agent, or Firm* — Young & Thompson

(57) ABSTRACT

A wireless AV transmitting set includes a remote controller main body having an internal memory device and an external connecting recess for stably holding a digital AV player therein, and a first pair of electric contacts, via which data is transmitted and power is supplied to the remote controller main body and the digital AV player in the connecting recess; a seat having a receiving recess for holding the remote controller main body and a second pair of electric contacts corresponding to the first pair of electric contacts for supplying an external power source to the remote controller main body received in the receiving recess; and a wireless transmitter provided on the remote controller main body for wirelessly transmitting AV data files stored in the digital AV player or the memory device to an external playing device for playing. Therefore, the remote controller main body has expanded functions.

10 Claims, 4 Drawing Sheets

WIRELESS AV TRANSMITTING SET

FIELD OF THE INVENTION

The present invention relates to an audio-visual (AV) transmitter, and more particularly to a wireless AV transmitting set that effectively expands the functions of a commercially available remote controller.

BACKGROUND OF THE INVENTION

FIG. 1 is a perspective view of a conventional remote controller, which includes a substantially rectangular case, on which a plurality of control keys are provided for controlling the actuation of different household appliances. That is, every key on the case has an independent control function. This conventional remote controller simply combines the control radio bands for various remote controllers into one general remote controller. With the quick development in the household appliance field, a lot of currently commercially available household appliances include a wireless control module as a controller thereof. Since each newly bought electrical appliance has a wireless remote controller shipped along therewith, most users have a large number of remote controllers for different appliances in their houses. It is obviously inconvenient and inefficient for people in the modern society to control many different appliances with a specific controller each.

To overcome the above-mentioned inconvenience and inefficiency in controlling different electrical appliances with many different remote controllers, there is developed a general remote controller, which has only one function, that is, to control two or more types of household appliances of different control radio bands with only one piece of controller. However, following the advanced electronic technologies, such general remote controller with only one function of remotely controlling different appliances fail to satisfy most consumers' requirements now. Consumers demand for a remote controller that provides more than one function and can be more easily powered or charged, and even serves as a power supply or a charger.

It is therefore tried by the inventor to develop a wireless audio-visual (AV) transmitting set to solve the problems existed in the conventional remote controllers.

SUMMARY OF THE INVENTION

A primary object of the present invention is to provide a wireless AV transmitting set, which includes a remote controller main body provided with a connecting recess for holding a digital AV player therein, so that AV signals may be transmitted from the digital AV player via a wireless transmitter on the remote controller main body to an external playing device for playing, giving the remote controller main body expanded functions.

Another object of the present invention is to provide a wireless AV transmitting set, which includes a seat on which a remote controller main body is received. The seat is provided with a power cord for connecting to a public power source, so as to convert the public AC power source into a DC power supply for charging the remote controller main body received in the seat and a digital AV player received in a connecting recess on the remote controller main body.

A further object of the present invention is to provide a wireless AV transmitting set, which includes a memory device provided in a remote controller main body. The memory device may be a micro hard disk, a flash memory, etc. for storing multimedia files thereon. And, external multimedia files may also be directly transmitted to and stored on the memory device. Internal signals of a playing device may also be transmitted to the memory device in the remote controller main body for storage. Therefore, the purpose of storing files can be achieved.

To achieve the above and other objects, the wireless AV transmitting set according to the present invention includes a remote controller main body having an internal memory device and provided on a top with a connecting recess for stably holding a digital AV player therein, such as an MP3 player, an MP4 player, an ipod player, a portable DVD player, etc., and at an underside with a first pair of electric contacts, via which data is transmitted, and power is supplied to the remote controller main body and the digital AV player held in the connecting recess; a seat provided on a top with a receiving recess, in which the remote controller main body may be held and a second pair of electric contacts is provided corresponding to the first pair of electric contacts for supplying an external power source to the remote controller main body received in the receiving recess; and a wireless transmitter provided on the remote controller main body for wirelessly transmitting AV data files stored in the digital AV player to an external playing device for playing. Therefore, the remote controller main body has expanded functions.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
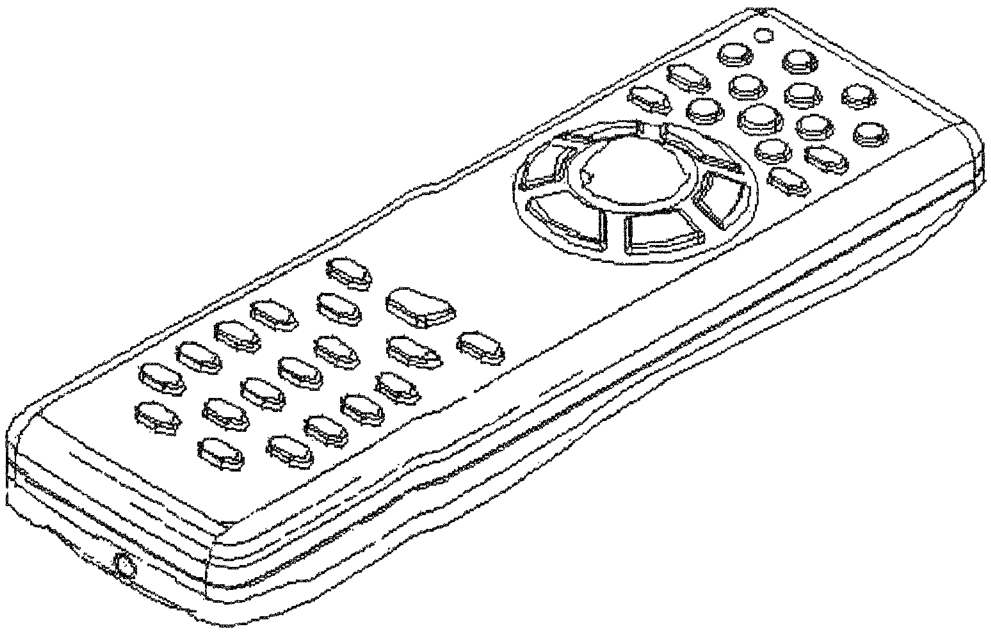
FIG. 1(prior art)
FIG. 1 shows a conventional wireless remote controller.
Figure 2:
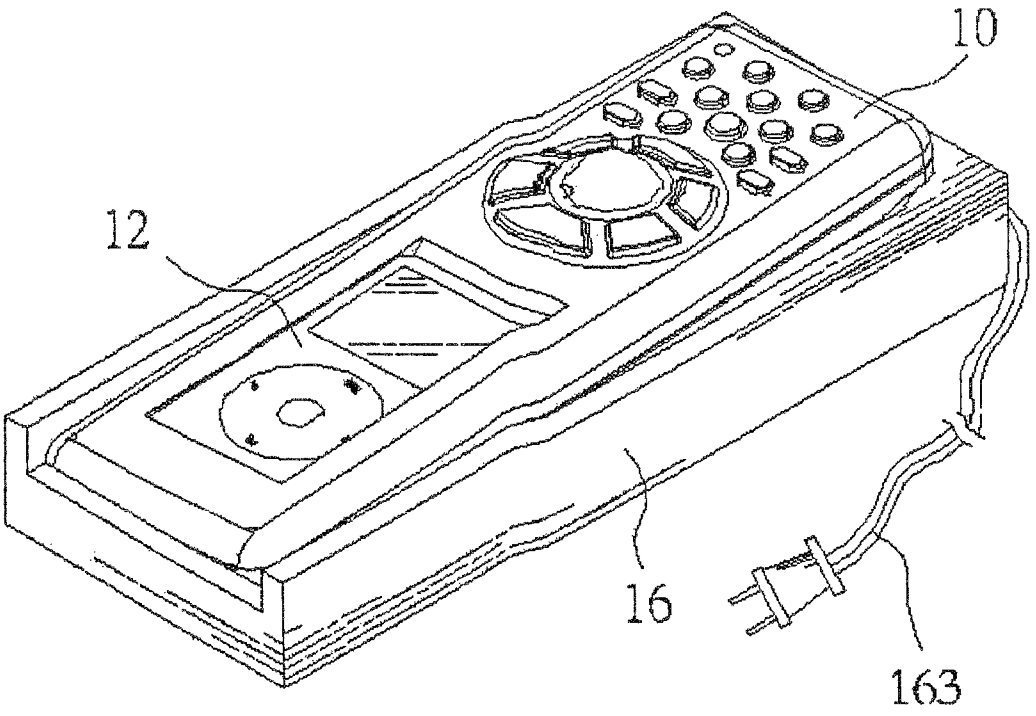
FIG. 2 is an assembled perspective view of a wireless AV transmitting set according to the present invention.
Figure 3:
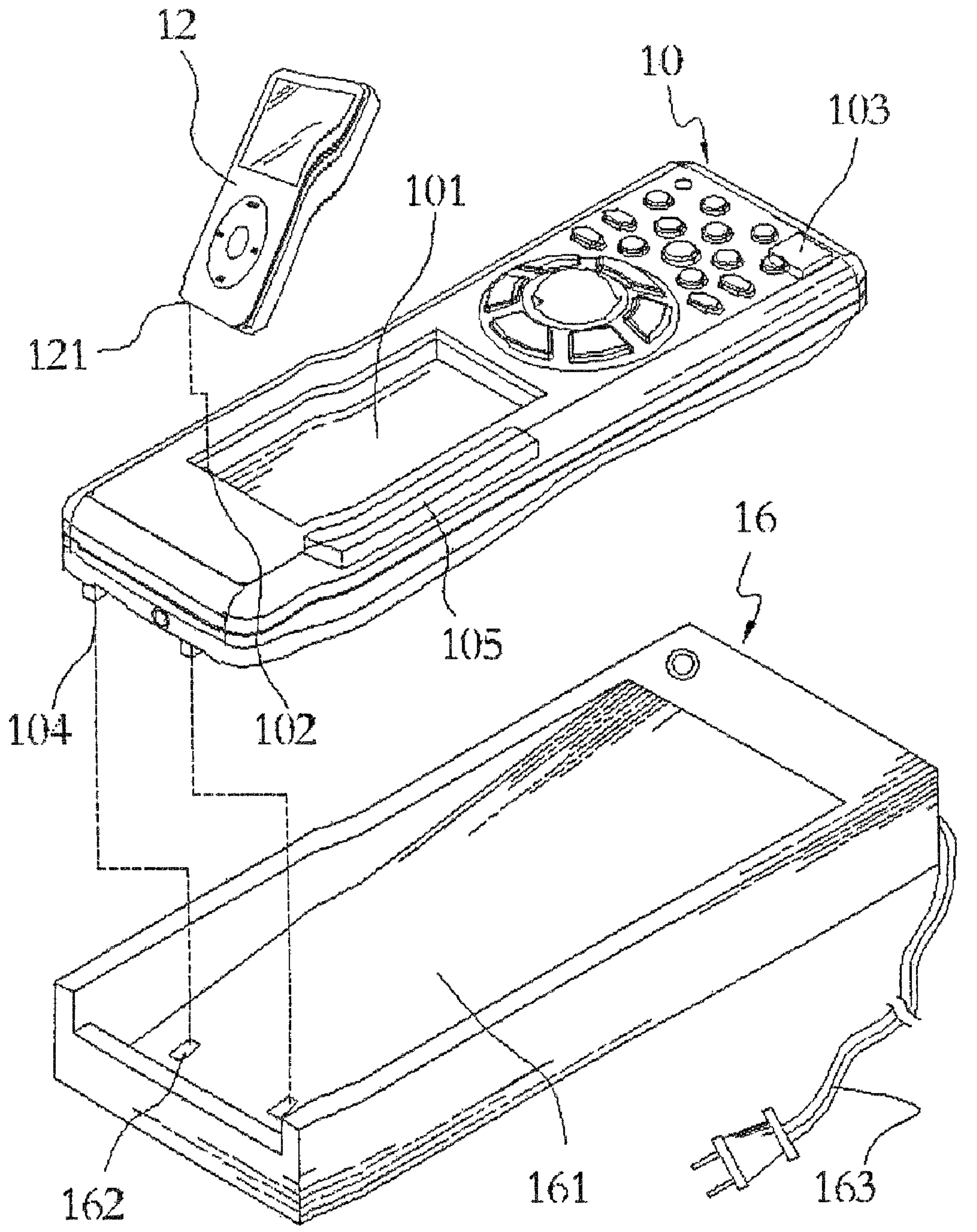
FIG. 3 is an exploded view of FIG. 2.

Please refer to FIGS. 2 and 3 that are assembled and exploded perspective views, respectively, of a wireless AV transmitting set according to the present invention. As shown, the wireless AV transmitting set of the present invention includes a remote controller main body 10 internally provided with a memory device 100. On the remote controller main body 10, there is provided a connecting recess 101 for stably holding a digital AV player 12 therein. The digital AV player 12 may be, for example, an MP3 player, an MP4 player, an ipod player, a portable DVD player, etc. The connecting recess 101 is provided at a bottom with a pair of electric contacts 102 corresponding to electric contacts 121 provided at an underside of the digital AV player 12. Therefore, the digital AV player 12 is positioned in the connecting recess 101 with the electric contacts 121 in contact with the electric contacts 102, allowing AV data stored in the digital AV player 12 to be transmitted to the remote controller main body 10 via the mutually connected electric contacts 102 and 121. The remote controller main body 10 is also internally provided with a rechargeable charging battery 105.

Figure 4:
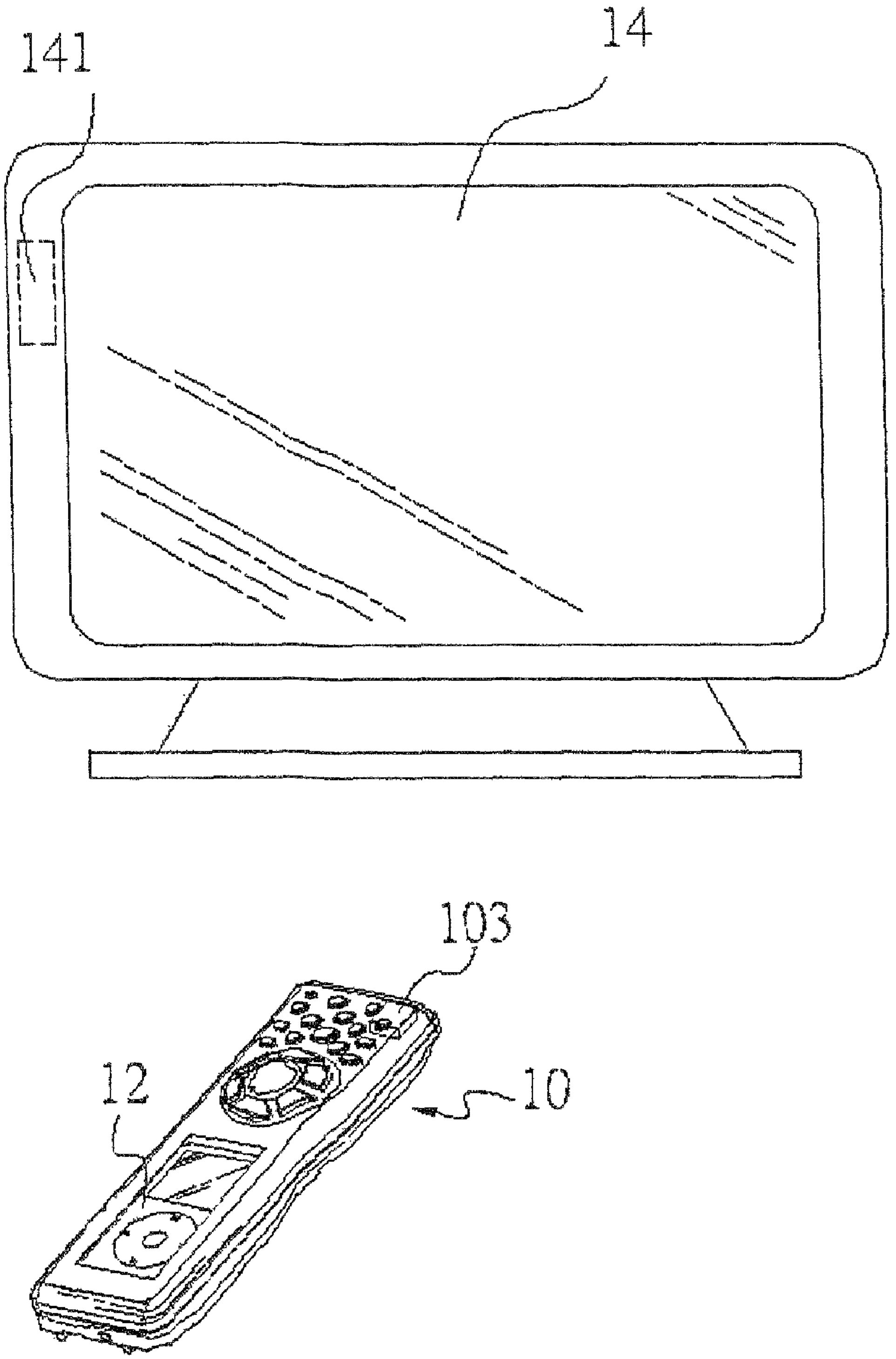
FIG. 4 shows an example of application of the wireless AV transmitting set of the present invention.

Please refer to FIGS. 3 and 4 at the same time. The remote controller main body 10 is provided at a predetermined position with a wireless transmitter 103, and an external playing device 14 is internally provided with a wireless receiver 141. The AV data in the digital AV player 12 is loaded to the wireless transmitter 103, and then sent to and received by the wireless receiver 141 inside the playing device 14, so that the AV data sent from the digital AV player 12 is played via the playing device 14. The remote controller main body 10 may be separably positioned in a receiving recess 161 on a seat 16. The seat 16 is detachably connected to a public power source via a power cord 163, and is capable of converting the public AC power into a DC power. The seat 16 is provided at predetermined positions with electric contacts 162 corresponding to a pair of electric contacts 104 provided at an underside of the remote controller main body 10. Therefore, the receiving recess 161 not only serves to hold the remote controller main body 10 therein, but also supplies power to and/or charges the remote controller main body 10 and the digital AV player 12 at the same time.

With the above arrangements, a conventional remote controller is effectively converted into a wireless AV transmitting set for wirelessly transmitting AV data stored in the digital AV player 12 to the playing device 14 via the remote controller main body 10 for playing.

The playing device 14 may be an AV or a video playing device, such as, for example, a video recorder for a home theater system, a television set, a computer monitor, or a digital stereo. Therefore, it is possible to play AV data at any place in a house without the need to locate a host of the playing device 14.

Moreover, the memory device 100 provided in the remote controller main body 10 may be a micro hard disk, a flash memory, etc. for storing multimedia files thereon. External multimedia files may be directly transmitted to the memory device 100 in the remote controller main body 10, so that the multimedia files stored on the internal memory device 100 may be directly sent from the remote controller main body 10 to the playing device 14 for playing back. And, internal signals of the playing device 14 may also be transmitted to the memory device 100 in the remote controller main body 10 for storage. The connecting recess 101 may be differently sized according to the digital AV player 12 to be used with the remote controller main body 10. The digital AV player 12 may also be other portable AV players of different specifications and sizes. Of course, a non-digital AV player may also be used with the remote controller main body 10.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A wireless AV transmitting set, comprising:

a remote controller main body provided at a predetermined position with a connecting recess for stably holding a digital AV player therein, and at an underside with a first pair of electric contacts, via which data is transmitted, and power is supplied to the remote controller main body and the digital AV player held in the connecting recess;

a memory device provided in the remote controller main body for storing multimedia files thereon;

a seat provided on a top with a receiving recess for separably receiving the remote controller main body therein; the receiving recess being provided at a bottom with a second pair of electric contacts corresponding to the first pair of electric contacts on the remote controller main body, such that power may be supplied from an external power source via the mutually contacted first and second pairs of electric contacts to the remote controller main body received in the receiving recess; and a wireless transmitter provided on the remote controller main body at a predetermined position for wirelessly transmitting AV data files stored in the digital AV player to an external playing device for playing.

2. The wireless AV transmitting set as claimed in claim 1, wherein the playing device is internally provided with a wireless receiver for receiving signals transmitted from the wireless transmitter.

3. The wireless AV transmitting set as claimed in claim 1, wherein the playing device is selected from the group consisting of a television set and a video recorder for a home theater system.

4. The wireless AV transmitting set as claimed in claim 1, wherein the memory device is selected from the group consisting of a micro hard disk and a flash memory.

5. The wireless AV transmitting set as claimed in claim 1, wherein the playing device is a computer monitor.

6. The wireless AV transmitting set as claimed in claim 1, wherein the seat includes an externally connected power cord, via which the seat is connected to a public power source.

7. The wireless AV transmitting set as claimed in claim 1, wherein the digital AV player is a portable AV player of any specification and any size.

8. The wireless AV transmitting set as claimed in claim 1, wherein the connecting recess may be differently sized depending on specification and size of the digital AV player to be held in the connecting recess.

9. The wireless AV transmitting set as claimed in claim 1, wherein the remote controller main body is provided with a rechargeable charging battery for supplying power to the remote controller main body.

10. The wireless AV transmitting set as claimed in claim 1, wherein the playing device is or a digital stereo.

* * * * *